US012159604B2

(12) United States Patent
Murthi et al.
(10) Patent No.: US 12,159,604 B2
(45) Date of Patent: *Dec. 3, 2024

(54) DYNAMIC CONFIGURATION OF DISPLAY CONTROLLER BASED ON CONFIGURATION OF CONNECTED DISPLAY PANEL

(71) Applicant: Roku, Inc., San Jose, CA (US)

(72) Inventors: Rajesh Murthi, San Jose, CA (US); Erwin B. Bellers, San Jose, CA (US); Paul Nangeroni, San Jose, CA (US); Adil Jagmag, San Jose, CA (US)

(73) Assignee: Roku, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/348,025

(22) Filed: Jul. 6, 2023

(65) Prior Publication Data

US 2023/0351981 A1 Nov. 2, 2023

Related U.S. Application Data

(63) Continuation of application No. 17/652,895, filed on Feb. 28, 2022, now Pat. No. 11,749,227.

(51) Int. Cl.
*G09G 5/00* (2006.01)
*G09G 3/00* (2006.01)

(52) U.S. Cl.
CPC ............. *G09G 5/005* (2013.01); *G09G 3/006* (2013.01); *G09G 5/006* (2013.01); *G09G 2320/0693* (2013.01); *G09G 2370/042* (2013.01)

(58) Field of Classification Search
CPC ........ G09G 5/003; G09G 5/005; G09G 5/006; G09G 3/006; G09G 2360/144; G09G 2370/042
See application file for complete search history.

(56) References Cited

U.S. PATENT DOCUMENTS

| | | | | |
|---|---|---|---|---|
| 8,661,497 | B2 | 2/2014 | Stone et al. | |
| 10,224,003 | B1 | 3/2019 | Aklyama et al. | |
| 11,538,424 | B2 | 12/2022 | Suzuki et al. | |
| 2001/0035914 | A1 | 11/2001 | Zhu et al. | |
| 2013/0169981 | A1* | 7/2013 | Takahashi | G06F 3/0488 358/1.9 |
| 2016/0098973 | A1* | 4/2016 | Yang | G09G 3/3406 345/207 |
| 2017/0039958 | A1* | 2/2017 | Ghosh | G09G 5/003 |
| 2018/0108114 | A1 | 4/2018 | Boshra-Riad | |

* cited by examiner

*Primary Examiner* — Xuemei Zheng
(74) *Attorney, Agent, or Firm* — McDonnell Boehnen Hulbert & Berghoff LLP

(57) ABSTRACT

A method and system to dynamically configure a display controller based on configuration of a display panel with which the display controller is connected. An example method includes the display controller detecting that the display panel is connected with the display controller. And the example method further includes, responsive to detecting that the display panel is connected with the display controller, (i) the display controller determining a configuration of the display panel, and (ii) based on the determined configuration of the display panel, the display controller dynamically configuring itself to interwork with the connected display panel having the determined configuration. This method could enable selective connection of a display controller with a display panel and automatic configuration of the display controller based on the configuration of the display panel.

20 Claims, 3 Drawing Sheets

DYNAMIC CONFIGURATION OF DISPLAY CONTROLLER BASED ON CONFIGURATION OF CONNECTED DISPLAY PANEL

REFERENCE TO RELATED APPLICATION

This is a continuation of U.S. patent application Ser. No. 17/652,895, filed Feb. 28, 2022, the entirety of which is hereby incorporated by reference.

BACKGROUND

A conventional display device such as a television (TV) or monitor includes two main components: a display panel and a display controller, which could further include or be coupled with one or more media input interfaces (e.g., High Definition Multimedia Interface (HDMI), Ethernet, WiFi, composite or component video, broadcast radio frequency (RF), etc.) for receiving from a media source (e.g., an over-the-top (OTT) media player or provider, a cable or satellite set top box (STB), an audio/video (A/V) receiver, or a computer) a media feed for presentation.

The display panel (or "display" portion of the device) has numerous rows and columns of pixels each controllable to present light with desired luminance and color in accordance with an input video signal. In some display devices, such as organic light emitting diode (OLED) displays, the pixels comprise individual diodes that can emit light possibly of select colors when supplied with electrical current. Whereas, in other display devices, such as a liquid crystal display (LCD) or other thin-film-transistor (TFT), backlight passes through a polarizing glass layer and then, for each pixel, through one or more molecules (e.g., liquid crystals) possibly for select colors, which, based on electrical current supplied to the molecule, control further polarization of the light and therefore control whether and to what extent the light passes through to be presented at a visible glass layer of the panel. A typical display panel also includes a timing controller (TCON) that functions to translate between an input video signal and row and column driver signaling that provides electrical charge to the pixels at a suitable refresh rate. Further, the display panel could also have other integrated components, such as ambient light sensors, microphones, touch sensors, audio speakers, and the like.

The display controller may then include a system on a chip (SoC) responsible for processing input media signals and producing associated control signals for driving the display panel. For instance, the SoC may operate to receive an input video signal through one of the interfaces noted, to decode and process sequential video frames of the signal, such as applying applicable scaling, color, and brightness adjustments for instance, and to send associated video output signals to the display panel to drive the TCON and ultimate video presentation. In addition, based on an evaluation of per-frame video content and/or other factors, the SoC may generate and provide control signaling to the display panel to control associated features such as a level of backlighting and/or zone-based dimming, among other possibilities. Further, the SoC may also operate to receive and process associated audio, such as to decode, mix, and apply gain adjustments to the audio, and to send associated audio output signals to the display panel for presentation.

The conventional display device may also include a serial interface for carrying control and data signals between the display controller and the display panel. Examples of such interfaces include low voltage differential signaling (LVDS), V-by-One, embedded display port (eDP), serial peripheral interface (SPI), inter-integrated circuit (I2C) interface, and Universal Serial Bus (USB), among others.

SUMMARY

In manufacturing a display device, a manufacturer may select component parts such as the display panel and display controller and integrate and configure those parts to work together. For instance, the manufacturer may take into account whether and to what extent the display panel has zone-based backlighting and may accordingly program the display controller to carry out any associated zone-based backlight control and video processing, among other possibilities. Because this display device would retain these component parts through its operational life, this manufacture-based programming of the display controller could be static, subject only to degradation and repair over time. Further, the manufacturer may need to carry out this same configuration process respectively for each display device model that it manufactures, such as for each pair of given model display control and a given model display panel.

The present disclosure provides a technological advance, enabling dynamic configuration of a display controller based on the configuration of the display panel with which the display controller gets connected. This arrangement can facilitate a modular, plug-and-play arrangement with little or no need for manual configuration of the display controller to work well with the connected display panel, thus possibly enabling service-center or end-user replacement of these component parts and possibly extending display-device life and offering other advantages.

In accordance with the disclosure, when the display controller gets physically connected with the display panel (e.g., through an interconnect interface), the display controller could detect that connection and could responsively engage in handshake signaling with the display panel to learn about the display panel's configuration. For instance, the display controller could receive from the display panel a set of configuration data that defines various structural features and capabilities of the display panel, and/or the display controller could receive from the display panel an identity of the display panel and could then do a cloud-database lookup to obtain configuration data for the display panel having the determined identity.

Upon determining the configuration of the display panel, the display controller could then dynamically configure itself based on the determined display panel configuration. Namely, the display controller could dynamically configure itself to interwork with the display panel having that particular display panel configuration.

By way of example, the display controller could determine what type of display technology the connected display panel uses, such as whether the display panel uses LCD or rather OLED technology for instance, and based on this information, the display controller could configure itself to apply a set of control logic most suitable for the determined display technology. As a related example, the display controller could determine that the connected display panel supports zone-based dimming and could further determine how many local-dimming zones the display panel has, and based on this information, the display controller could configure itself to engage in backlighting-control and/or video processing in an associated manner. Still further, as another example, the display controller could determine a color-space mapping that would work well with the connected display panel, for translating per-pixel color data in a received video signal to per-pixel color data interpretable by the connected display panel, and the display controller could configure itself to apply that color-space mapping. Numerous other examples could be possible as well.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
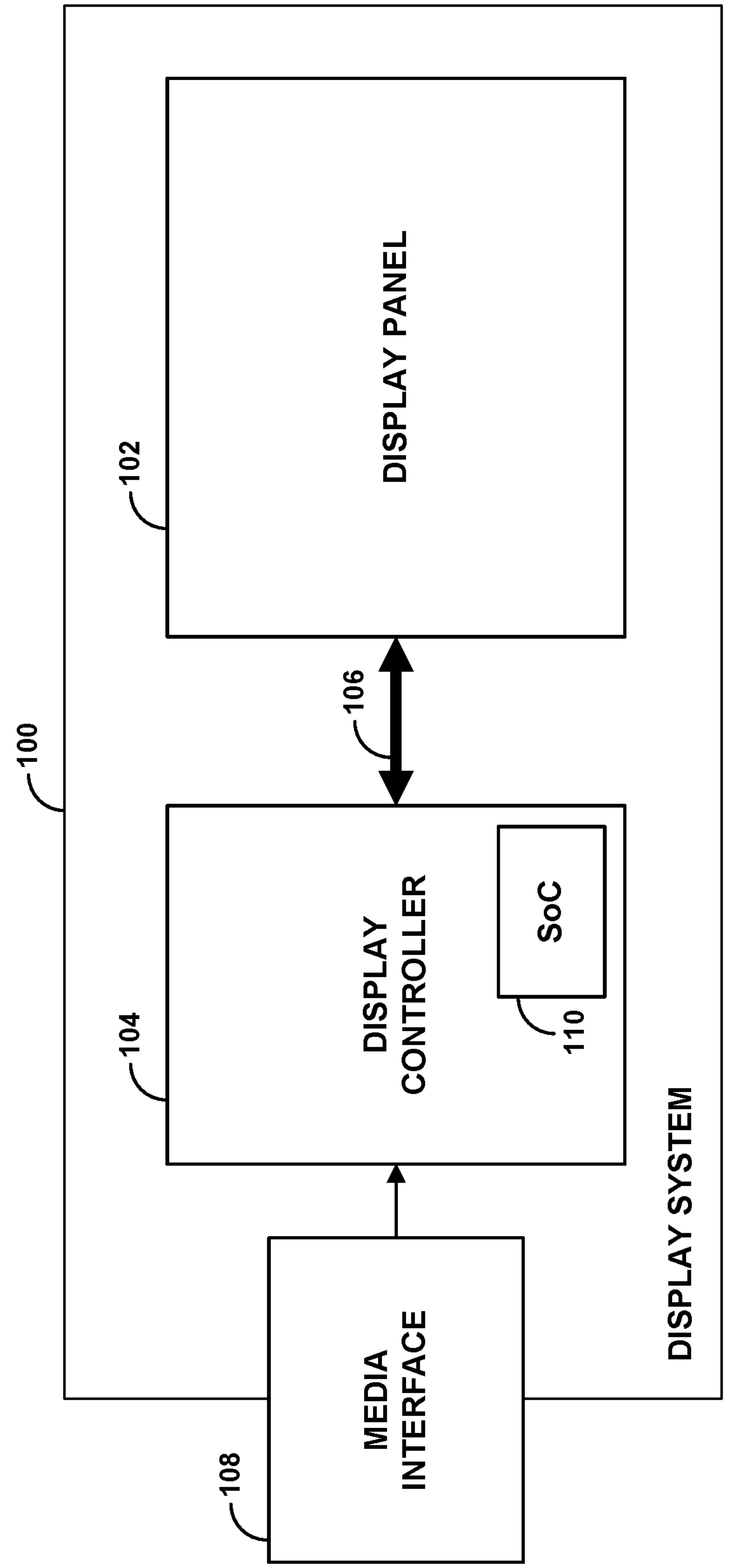
FIG. 1 is a simplified block diagram of an example system in which various disclosed principles can be applied.

Referring to the drawings, as noted above, FIG. 1 is a simplified block diagram of an example display system 100 in which various disclosed principles can be applied. It will be understood, however, that this and other arrangements and processes described herein can take various other forms. For instance, elements and operations can be re-ordered, distributed, replicated, combined, omitted, added, replaced, or otherwise modified. Further, it will be understood that operations described herein as being carried out by one or more components of the system could be implemented by and/or on behalf of those components, through hardware, firmware, and/or software, such as by one or more processing units executing program instructions or the like.

As shown in FIG. 1, the example display system 100 includes a display panel 102 and a display controller 104 coupled together by a serial interface 106 or other connection mechanism. This display system 100 could be structured as a unitary display device such as a TV or monitor, having the controller 102 and panel 104 in a common housing arranged for mounting on a wall or other convenient placement. Or the display system 100 could be distributed, with the panel 102 being in a respective housing at one location (e.g., one position in a room) and the controller 104 being in a separate respective housing at another location (e.g., another position in the room).

As further shown in FIG. 1, the example display system 100 is structured to receive a media feed 106 through one or more media input interfaces 108, to facilitate presentation of the media feed by the panel 102. A representative media feed could include a video signal that defines a sequence of video frames encoded according to a standard video encoding scheme and could further include an associated audio signal synchronized with the video and encoded according to a standard audio encoding scheme. For instance, the media feed could include separate but synchronized video and audio channels. Further, depending on the media input interface 106, the media feed could comprise video and audio data as respective media streams and could further carry those media streams in a packet-based transport stream with multiplexed video and audio packets, among other possibilities. Example media input interfaces 108 could include, without limitation, any of those noted above.

In line with the discussion above, the panel 102 could have a particular configuration such as particular structural features and/or capabilities. For example, the panel 102 could have a particular type of display technology, such as LCD or OLED. Further, depending on the display technology, the panel 102 could have certain structural details and capabilities. For instance, if the panel 102 is an LCD panel with backlighting among other possibilities, the panel 102 may or may not support zone-based backlight dimming. And if the panel 102 supports zone-based dimming, the panel 102 may have a particular quantity of dimming zones defining backlighting for respective viewable regions of the panel 102. As another example, the panel 102 could have a particular color space, such as color gamut information, that defines color values (e.g., red, green, blue (RGB) values) interpretable by the panel 102 in a particular manner to result in the panel rendering associated colors. And as yet other examples, the panel could include one or more associated components, such as an ambient light sensor, a camera, a speaker, a microphone, a front-panel interface, and/or a touch interface, perhaps each having associated positions and/or other attributes.

Also in line with the discussion above, the controller 104 could operate to process media that it receives through one or more media interfaces 108 and to provide the processed media to panel 102 for presentation. As noted above, for instance, the controller could operate to decode, scale, and adjust brightness and color of video signals, and to send the resulting video signals to the panel 102 for presentation. Further, the controller could generate and send control signals to the panel 102 in order to control various features of the panel 102, such as zone-based dimming for instance. As noted above, the controller 104 could include an SoC 110 that could carry out these and other operations. In particular, the SoC 110 could include one or more processors such as central processing units (CPUs), microcontroller units (MCUs), as well as non-transitory data storage holding program instructions executable by the one or more processors to carry out the operations.

Figure 2:
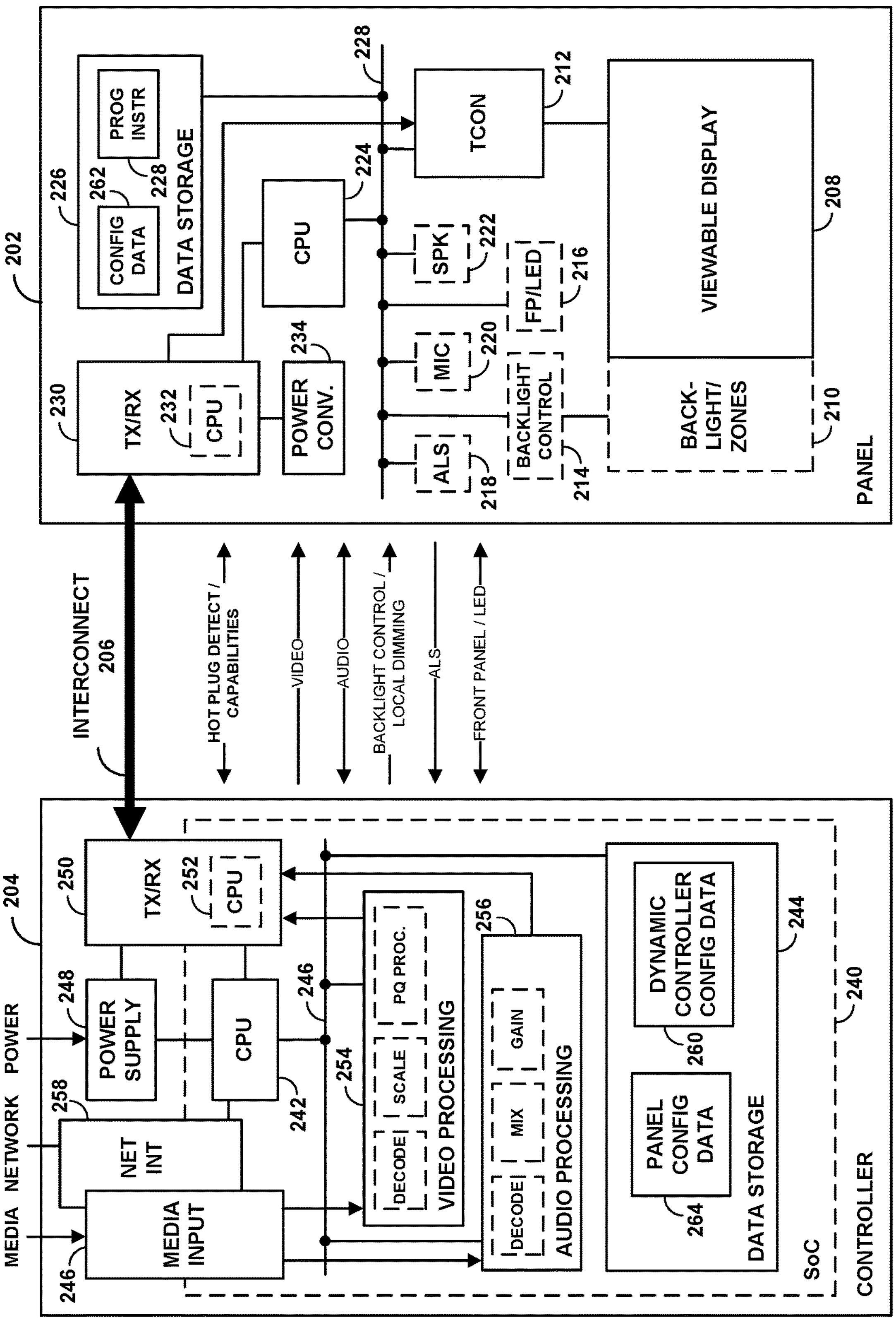
FIG. 2 is a more detailed but still simplified block diagram of the example system.

FIG. 2 is next a simplified block diagram that illustrates in more detail some of the functional blocks that could be included in an example display system in a representative but non-limiting implementation. As shown in FIG. 2, the example display system includes a panel 202 and a controller 204, which could function generally as discussed above in connection with FIG. 1 and could be interconnected with each other by a serial interconnect interface 206 or other connection mechanism.

In an example implementation, the interconnect 206 could comprise physical lines such as twisted pair, fiber, and/or other physical media, configured to carry media and control signaling between the controller 204 and the panel 202 and could support high speed serial communication according to any of the various interface protocols noted above, among other possibilities. Further, the interconnect 206 could include one or more lines for carrying power, such as a high voltage direct current, from the controller 204 to the panel 202. And the interconnect 206 could include one or more connectors configured to facilitate physical coupling of these lines between the controller 204 and the panel 202.

In the example arrangement shown in FIG. 2, the panel 204 includes at its core a viewable display subsystem 208, such as an LCD or OLED display for instance. Further, shown optionally as part of the display subsystem 208 is a backlight 210, possibly as multiple separately-controllable localized zones of backlight. As noted above, this backlighting would be included in an LCD panel but may be unnecessary and not included in an OLED panel.

As further shown, the example panel 202 includes a TCON 212, which, as noted above, could control timing of electrical signaling to row and column drivers to facilitate precise pixel rendering. In addition, the example panel 204 includes various other components, such a backlight control subsystem 214 (e.g., switch, modulator or the like) for controlling the backlight 210, a front panel and LED subsystem 216 for receiving user input and providing LED indicia, one or more ambient light sensors 218 for detecting a level of ambient light at the panel 202, one or more microphones 220 for receiving user audio input, and one or more speakers 222 for presenting audio. Other examples are possible as well. For instance, as noted above, a representative display could also include one or more cameras and one or more touch interfaces, and/or other components now known or later developed.

As additionally shown, the example panel 202 includes a CPU 224 and data storage 226. The CPU 224, which could be a multi-core CPU and/or could take other forms, could be communicatively linked with the data storage 226, with the TCON 212, and with other components of the panel 202 through a system bus or other connection mechanism 228. And the data storage 226, which could alternatively be integrated with the CPU 224, could comprise one or more non-transitory storage components such as read only memory (ROM), random access memory (RAM), electrically erasable programmable ROM (EEPROM), and/or flash memory, among other possibilities. In practice, the CPU 224 could function to generally control operation of the panel 202. For instance, the data storage 226 could hold program instructions 228, and the CPU 224 could be configured to execute those program instructions in order to carry out or cause the panel 202 to carry out various panel operations described herein.

As further shown, the example panel 202 includes a transceiver (transmitter/receiver) 230, through which the panel 202 could communicate with the controller 204 over the interconnect 206, such as to receive media (e.g., video and audio), control signals, and power from the controller 204, and to send media (e.g., microphone input and/or camera input) and control signals to the controller 204. This transceiver 230 could thus include a connection mechanism such as a port or plug that defines or mates with the interconnect 206. In addition, the transceiver 230 as shown could optionally include a separate CPU 232, which may help to facilitate some of the dynamic controller configuration operations presently contemplated.

Further, the example panel 202 includes a power conversion subsystem 234. This power control subsystem 234 could receive power supplied by controller 204 or from another source and could convert the power to levels suitable for driving various components of the panel 202, such as the CPU 224, the TCON 212, and the backlight 210, among other possibilities.

Turning next to the example controller 204 shown in FIG. 2, the controller 204 as noted above could include an SoC 240. As shown, the SoC 240 could include a CPU 242 and data storage 244, which could be communicatively linked with each other by a system bus or other connection mechanism 246. The CPU 242 could be a multi-core CPU or could take other forms. And the data storage 244, which could alternatively be integrated with the CPU 242, could comprise one or more non-transitory storage components such ROM, RAM, EEPROM, and/or flash memory, among other possibilities. In practice, the CPU 242 could function to generally control operation of the controller 204. For instance, the data storage 244 could hold program instructions, and the CPU 242 could be configured to execute those program instructions in order to carry out or cause the controller 204 to carry out various controller operations described herein.

As further shown, the example controller 204 includes at least one media input block 246 for receiving input media to be processed by the controller 204 and delivered to the panel 202 for presentation. In line with the discussion above, the media input block 246 could include one or more media input interfaces such as HDMI, Ethernet, WiFi, composite or component video, broadcast RF, or the like. Through these or other such interfaces, the controller 204 could receive input media from a local media source (e.g., OTT player, STB, AV receiver, Blu-ray player, computer, etc.) and/or from a remote source (e.g., an OTT streaming service, an over-the-air TV broadcaster, etc.) And as discussed above, this received media could include a video signal defining a sequence of video frames and could additionally include an audio signal synchronized with the video signal. For instance, the received media could be a particular OTT channel and/or a particular TV channel, among other possibilities, including both video and audio.

As additionally shown, the example controller 204 includes a power supply block 248. The power supply block 248 could receive power from an external power source and could supply power to other components of the controller 204. For instance, the power supply block 248 could receive alternating current power and could transform that received power to direct current for driving other components of the controller 204 such as CPU 242.

Further, as shown, the example controller 204 includes a transceiver 250, through which the controller 204 could communicate with the panel 202 over the interconnect 206, such as to send control signals to the panel 202 and to receive control signals from the panel 202. Like the transceiver 230 of the panel, this transceiver 250 could thus include a connection mechanism such as a port or plug that defines or mates with the interconnect 206. Further, this transceiver 250 may similarly include a separate CPU 252, which may help to facilitate some of the dynamic controller configuration operations presently contemplated.

As noted above, the interconnect 206 may carry power from the controller 204 to the panel 202. For instance, the controller's power supply 248 could provide high voltage direct current to the controller's transceiver 250, and that direct current could pass over the interconnect 206 to the panel's transceiver 230 and in turn to the panel's power conversion subsystem 234. As noted above, the power conversion subsystem 234 could then convert that power to levels suitable for driving various components of the panel 202.

In example operation of this display system, as the controller 204 receives an input media stream, the controller 204 could process the media stream through a number of processing blocks to produce output media that the controller 204 would provide to the panel 202 for presentation. These processing blocks could take the form of dedicated hardware modules that carry out media processing operations under the control of CPU 242. CPU 242 may thus provide control signaling to the modules to control which such operations the modules carry out and to provide the modules with information to facilitate carrying out the processing operations in a desired manner.

FIG. 2 illustrates non-limiting examples of these processing blocks as video processing blocks 254 and audio processing blocks 256, each of which could receive media from one or more media input interfaces 246 and output processed media to the transceiver 250 for transmission over interconnect 206 to the panel 202. In the example shown, the video processing blocks 254 could support carrying out video processing steps such as decoding, scaling, and applying various picture quality (PQ) tuning functions to help optimize the video for presentation, and the audio processing blocks 256 could operate to carry out audio processing steps such as decoding, mixing, and application of suitable gain control. A representative controller could support additional or alternative video and/or audio processing operations as well.

As the controller processes video and the audio of an example input media stream, the resulting processed video and audio signals could thus pass to the panel 202 for presentation. For instance, the processed media could pass from the processing blocks 254, 256 to the controller's transceiver 250, then over the interconnect 206 to the panel's transceiver 230, and in turn to the various components of the panel 202 handling. For instance, processed video could pass to the panel's TCON 212, and the TCON 212 could responsively output corresponding signals to column and row drivers (not shown) of the viewable display 208 in order to drive per-pixel rendering of each video frame for viewing by a user. Further, processed audio might pass to the CPU 224 and in turn to the speaker(s) 222, or more directly to the speaker(s) 222, for audible presentation to the user.

In addition, while the controller 204 is processing and conveying media to the panel 202 for presentation, the controller 204 and panel 202 could work with each other to facilitate various display system operations.

For example, in an implementation where the panel 202 is a type (e.g., LCD) that has backlighting 210 and supports zone-based dimming to separately backlight respective regions of the display 208 with respective levels of brightness, the controller 204 could control the level of backlighting that the panel 202 provides per zone, based on the controller's evaluation of the video signal being presented. For instance, on a per-video-frame basis, for frame regions where the frame image is especially dark, the controller 204 could direct the panel 202 to reduce the brightness of each associated zone, and for frame regions where the frame image is especially bright, the controller 204 could direct the panel 202 to increase the brightness of each associated zone. More particularly, the controller 204 may provide the panel 202 with control signals for receipt by backlight control subsystem 214, which could responsively operate to modulate zones of backlight 210 accordingly.

As another example, in an implementation where the panel 202 includes one or more ambient light sensors 218, the light sensor(s) 218 could detect a level of ambient light at the display 208, the panel 202 could send to the controller 204 data indicating the level of ambient light, and the controller 204 could use the indicated level of ambient light as a basis to control video processing. For instance, when the ambient light is especially low, the controller 204 may reduce the brightness of pixels in the video signal, and when the ambient light is especially high, the controller 204 may increase the brightness of pixels in the video signal.

As yet another example, in an implementation where the panel 202 has a particular color space defining color values (e.g., RGB values) that would be interpretable by the panel to facilitate rendering of particular colors on the display 208, the controller 204 could engage in color-space mapping to translate per-pixel color values in an input video signal into different per-pixel color values that will be interpretable by the panel 202 to present expected associated colors. For instance, the controller could have a mapping table that maps particular color values to color values that would be so interpretable by the panel 202.

As still another example, in an implementation where the panel 202 includes one or more microphones 220, when the microphone(s) 220 receive input audio such as user voice commands, the panel 202 could convey that audio to the controller 204, and the controller 204 could use that audio as a basis to control operation of the display system. And in an implementation where the panel 202 includes a front panel interface with one or more LED indicators, the panel 202 could convey information about panel input to the controller 204, and the controller 204 could cause the panel to present LED indicators to convey status information to a user.

As noted above, the present disclosure provides for dynamically configuring a display controller based on configuration of a display panel, automatically upon interconnection of the panel and controller. In the arrangement of FIG. 2, this dynamic configuration could occur automatically upon connection of the panel 202 with the controller 204 through interconnect 206.

In an example implementation, when the panel 202 and the controller 204 get connected with each other, they could engage in handshake or other control signaling with each other. Through this signaling, the panel 202 could convey to the controller 204 information about the configuration of the panel 202, such as the structure and capabilities of the panel 202, and the controller 204 could use this information as a basis to configure itself so as to optimize operation of the controller 204 in view of the configuration of the panel 202. Some or all of this optimization could relate to PQ tuning at the controller 204, to help facilitate providing optimal picture quality of video to be presented by the panel 202. Further, some of this optimization could relate to other operations of the display system.

Dynamically configuring the controller 204 based on the configuration of the connected panel 202 could involve the controller 204 provisioning itself to carry out particular processing operations in view of the configuration of the connected panel 202, including storing dynamic controller configuration data 260 in its data storage 244 and controlling the video and/or audio processing modules 254, 256 accordingly. For instance, the act of configuring the controller 204 based on configuration of the connected panel 202 could involve the controller's CPU 242 activating, deactivating, or configuring operations that the CPU 242 could carry out and/or activating, deactivating, or configuring operations that the video and/or audio processing blocks 254, 256 could carry out. Further, the act of configuring the controller 204 based on configuration of the connected panel 202 could involve the CPU 242 setting one or more flags in dynamic controller configuration data 260 to which the CPU 242 could respond in practice by engaging in various control operations, such as to provide control signaling to the processing blocks 254, 256 and/or to provide control signaling to the panel 202.

Alternatively or additionally, dynamically configuring the controller 204 based on configuration of the connected panel 202 could involve the controller 204 obtaining new program logic and/or reference data that enables the controller 204 to carry out operations specific to the panel 202, so that the CPU 242 would make use of that program logic and/or reference data when operating in connection with the panel 202. For instance, in view of the configuration of the connected panel 202, the CPU 242 could query to a cloud server through a wired or wireless network communication interface 258 (which could also serve as a media input interface 246) to obtain program instructions and/or reference data useable by the CPU 242 and/or data that could cause the processing blocks 254, 256 to operate in a manner specific to the configuration of the panel 202. And the CPU 242 could then engage in associated control signaling.

In operation, the controller 204 and panel 202 could engage in a panel-configuration detection process upon becoming connected with each other, and through this process, the controller 204 could learn various configuration properties of the panel 202 so as to then configure itself based on the configuration of the panel 202. FIG. 2 illustrates this process as a "hot plug detect/capabilities" exchange between the example controller 204 and the example panel 202.

To facilitate this panel-configuration detection process in an example implementation, the panel 202 could be pre-provisioned with panel configuration data 262 that indicates, directly or indirectly, various configuration properties of the panel 202. For instance, as shown in FIG. 2, this configuration data 262 could be stored in data storage 226 of the panel 202. In an example implementation, this configuration data 262 could be specific to a make and model, and perhaps the manufacturing lot and even the individual production unit, of the panel, among other possibilities. The configuration data 262 could directly indicate various configuration properties of the panel 202, by setting forth the configuration properties in an extensible markup language (XML) file or other format. Alternatively, the configuration data 262 could indirectly indicate various configuration properties of the panel 202 by specifying a unique code such as an identifier of the panel 202, which a cloud server could map to the an XML file or other representation of configuration properties of the panel 202.

An example panel-configuration detection process could use power transfer from the controller 204 to the panel 202 as a trigger for the controller 204 determining configuration of the panel 202. For instance, when the controller 204 gets connected to the panel 202, power could flow from the controller 204 to the panel 202 as noted above, and the panel's CPU 224 could detect and respond to this power by transmitting a control signal to the controller 204, which could in turn cause an interrupt on a general purpose input/output (GPIO) pin of the controller's CPU 242.

This interrupt at the controller's CPU 242 could indicate to the CPU 242 that a panel is now connected with the controller 204. In response, the controller's CPU 242 could then transmit a query signal to the panel's CPU 224, requesting configuration data of the panel 202. And the panel's CPU 224 could respond to this query by getting from data storage 226 and transmitting to the controller's CPU 242 the panel's configuration data 262. Further, the controller's CPU 242 could provide one or more follow-up queries to the panel's CPU to obtain additional panel configuration data.

Alternatively or additionally, the transceiver CPUs 232, 252 of the panel 202 and controller 204 could be involved in this process. For instance, the panel's transceiver CPU 232 could detect power from the controller 204 upon in initial connection and could responsively signal to the controller 204, and the controller's transceiver 252 could query to the panel 202 to obtain the panel's configuration data 262 and could pass that configuration data along to the controller's CPU 242. Other examples could be possible as well.

Further, in an alternative implementation, power could originate at the panel 202, and the controller 204 could detect its connection with the panel 202 upon detecting receipt of power over the interconnect 206. In response to detecting that power, the controller 204 could then query to the panel to obtain the panel's configuration data 262. Other implementations could be possible as well.

Upon receipt of the panel's configuration data 262, the controller's CPU 242 could store the configuration data or associated configuration data in the controller's data storage 244 as panel configuration data 264. To the extent the CPU 242 obtains an direct indication of the panel's configuration such as an XML file listing panel configuration properties, for instance, the CPU 242 could store that direct indication in the data storage 244. Further, to the extent the CPU 242 obtains an indirect indication of the panel's configuration such as a panel identification code or the like, the CPU 242 could then query to a cloud server or other entity through the network interface 258 to obtain a direct indication of the panel's configuration, and the CPU 242 could then store that panel configuration data in the data storage 244.

Once the controller 204 has thus determined the panel's configuration, the controller 204 could respond to that determination by configuring itself to operate in a manner specific to the configuration of the panel 202 as noted above. For instance, the controller's CPU 242 could activate, deactivate, or configure certain operations of the CPU 242 and/or the processing blocks 254, 256, to cause the CPU 242 and/or the processing blocks 254, 256 to operate in a manner based on and thus depending on the determined configuration of the panel 202.

Optimally through this process, the dynamic configuration of the controller 204 could vary based on which panel 202 the controller 204 gets connected to. For instance, if the controller 204 gets connected with a first panel 202 that has a first configuration, then the controller 204 could become dynamically configured with first controller-configuration properties, such as with first controller functions. Whereas, if the controller 204 gets connected with a second panel 202 that has a second configuration different than the first configuration, then the controller 204 could become dynamically configured with second controller-configuration properties different than the first controller-configuration properties, such as with second controller functions different than the first configuration functions.

This dynamic configuration could take various forms, based on various configuration properties of the connected panel 202.

By way of example, the controller 204 could dynamically configure itself based on what type of display technology the panel 202 uses. For instance, the controller 204 could determine the display technology of the panel 202, such as whether the panel 202 is an LCD panel or rather an OLED panel. And based on this information, the controller 204 could control whether or not the controller 204 will manage zone-based dimming of the panel 202.

As noted above, an LCD panel would have backlighting and may support backlight dimming such as zone-based dimming for instance, whereas an OLED panel would not have backlighting because each of its pixels would be separately self-emitting. So if the controller 204 determines that the panel 202 is an LCD panel, then the controller 204 could configure itself to engage in panel-backlighting control, such as determining what adjustments to make to the panel backlighting and generating and sending associated control signals to the panel 202. Whereas, if the controller 204 determines that the panel 202 is an OLED panel, then the controller 204 could configure itself to not carry engage in such panel-backlighting control.

In line with the discussion above, for example, the controller 204 could be provisioned with panel backlighting control logic, such as program instructions defining one or more routines that the controller 204 could carry out to control backlighting of a connected panel, and the controller 204 could activate or deactivate this control logic based on the display technology of the connected panel 202. For instance, based on the determination of whether the panel 202 is an LCD panel or rather an OLED panel, the controller 204 could set or clear a flag as part of the dynamic controller configuration data 260 in the data storage, to which the controller 204 could refer as a basis to determine in practice whether to engage in panel-backlighting control. And the controller 204 could then operate accordingly.

As another example, if the panel has backlighting, then the controller 204 could dynamically configure itself based on a backlight-dimming configuration of the panel 202.

For instance, the controller 204 could determine one or more backlight-dimming capabilities of the panel such as whether the panel 202 supports zone-based dimming in the form of full array local dimming (FALD) or rather just global dimming, and the controller 204 could configure itself based on this determination. For example, if the controller 204 determines that the panel supports zone-based dimming, then the controller 204 could configure itself to engage in per-zone backlight dimming control, such to determine per video frame the level of picture brightness per video-frame region and to responsively generate and send control signals to the panel 202 to cause the panel 202 to modulate backlighting on a per zone basis accordingly. Whereas, if controller 204 determines that the panel does not support zone-based dimming, then the controller 204 could configure itself to forgo engaging in such per-zone backlight dimming control.

Alternatively or additionally, the controller 204 could determine how many backlight dimming zones the panel 202 has and perhaps other information about the physical arrangement of those dimming zones in relation to video frames, and the controller 204 could configure itself based on this information. For instance, based on the quantity of backlight dimming zones that the panel 202 has, the controller 204 could configure itself to engage in associated video-frame analysis and providing of associated control signaling to the controller. For example, if the panel 202 is divided into four frame-regions defining respective backlight dimming zones, then the controller 204 could analyze per-frame brightness on a per quadrant basis and provide associated backlight-dimming control signals to the panel 202 to control per-quadrant backlight dimming. Whereas, if the panel is divided into some other number or arrangement of backlight dimming zones, then the controller 204 could engage in other associated video-frame analysis and signaling to the panel 202.

As yet another example, the controller 204 could dynamically configure itself to apply color-space mapping specifically based on a color-space configuration of the panel 202. As noted above, the panel 202 could have a particular color space such as particular color gamut information that defines color values interpretable by the panel 202 to result in the panel rendering of particular colors. This color space may differ, however, from the color space used in a conventional received video feed. Therefore, as noted above, the controller 204 could engage in color-space mapping to translate per-pixel color values in an input video signal into different per-pixel color values that would be interpretable by the panel 202 to cause the panel 202 to present expected colors.

To facilitate dynamically configuring the controller 204 to engage in color-space mapping in a manner specific to the connected panel 202, the controller 204 could obtain a set of color-gamut mapping data specific to the panel 202, based on the panel's color-space configuration, and could store that color-space mapping data and then apply the color-space mapping when processing video for presentation by the panel 202. For instance, the controller 204 may receive this color-space mapping data as part of the panel configuration data from the panel 202 and could store and apply the mapping. Or the controller may receive a unique identifier of the panel 202 and query a cloud server based on that identifier, to obtain the color-space mapping data. Given this panel-specific color-space mapping data, the controller 204 could then apply the mapping in practice by using the mapping to translate per-pixel color values in video signals that the controller 204 sends to the panel for presentation.

As still another example, the controller 204 could dynamically configure itself based on ambient light sensor configuration of the panel 202. Different ambient light sensors may have different sensitivity curves, signal-to-noise ratios, and other properties. For example, one such sensor may provide a 1.2 Volt signal to represent a given level of ambient light, whereas another such sensor may provide a 0.8 Volt signal to represent the same level of ambient light. But the controller 204 may use the level of ambient light at the panel 202 as a basis to control brightness of pixels in a video signal and perhaps to control backlight brightness at the panel 202. So it could be useful for the controller 204 to normalize any such ambient light sensor readings in a manner that allows the controller 204 to operate accordingly.

To address this issue, the controller 204 could determine as an aspect of the panel configuration a level of sensitivity and/or one or more other properties of one or more ambient light sensors of the panel 202, and the controller 204 could use that information in practice as a basis to normalize ambient-light-sensor readings that the controller 204 receives from the panel 202 in practice. This normalizing could thereby provide the controller 204 with a common ambient-light level value for the level of ambient light noted above regardless of which of the light sensors noted above are in use, so that the controller 204 can then process video signal brightness and/or control panel backlighting accordingly.

As yet additional examples, the controller 204 could dynamically configure itself based on an audio-interface configuration of the panel 202, a camera configuration of the panel 202, and/or touch-screen configuration of the panel 202, among other possibilities.

As to audio configuration, for instance, the controller 204 could determine whether and to what extent the panel 202 has one or more integrated sound speakers and/or microphones, and perhaps the position of any such sound speaker(s) or microphone(s), and the controller 204 could then configure itself accordingly, such as to control whether and to what extent to send audio to the panel 204 (e.g., what channels of audio to provide) and whether and to what extent to receive audio from the panel 202 (e.g., for the controller 204 to provide to a connected device) Likewise, as to camera configuration, for instance, the controller 204 could determine whether and to what extent the panel 202 has one or more integrated cameras, and perhaps the position of any such camera(s), and the controller 204 could then configure itself accordingly, such as to control whether and to what extent to receive camera input from the panel (e.g., for the controller 204 to provide to a connected device). And as to touch-screen configuration, for instance, the controller 304 could determine whether and to what extent the panel 202 has touch sensors, and the controller 204 could then configure itself accordingly, such as to control whether and to what extent to receive touch input from the display panel (e.g., for the controller 204 to provide to a connected device).

Figure 3:
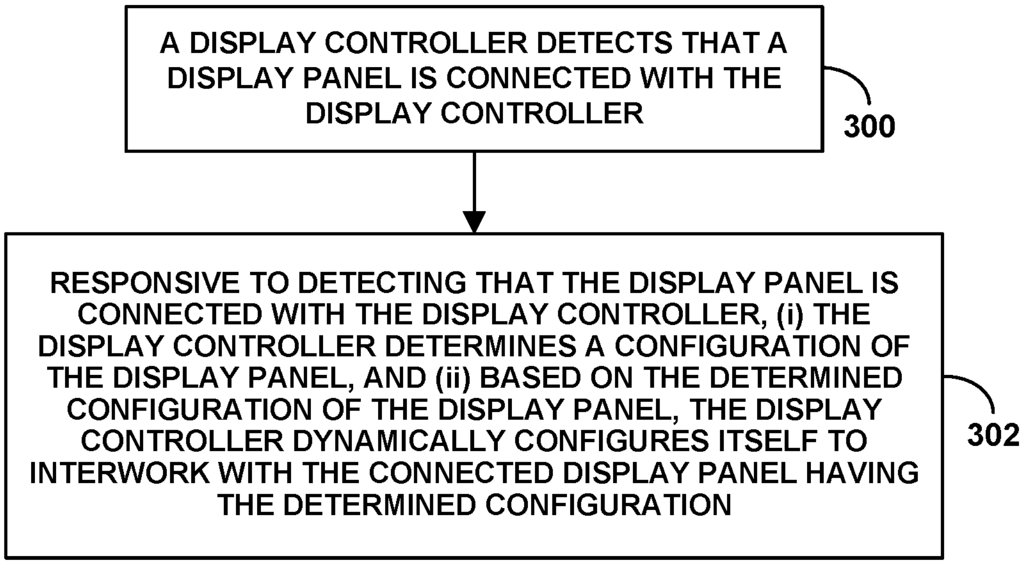
FIG. 3 is a flow chart depicting a method that can be carried out in accordance with the disclosure.

FIG. 3 is next a flow chart illustrating a method that could be carried out in accordance with the present disclosure, to dynamically control configuration of a display controller based on configuration of a connected display panel.

As shown in FIG. 3, at block 300, the method includes the display controller detecting that the display panel is connected with the display controller. And at block 302, the method includes, responsive to detecting that the display panel is connected with the display controller, (i) the display controller determining a configuration of the display panel, and (ii) based on the determined configuration of the display panel, dynamically configuring the display controller to interwork with the connected display panel having the determined configuration. For instance, responsive to the display controller determining the configuration of the display panel, the display controller could configure itself to operate in a manner that is based on the determined configuration of the display panel.

In line with the discussion above, when the display controller and display panel are connected with each other, they could cooperatively form at least part of a television. Further, as discussed above the display panel could be connected with the display controller through a serial interconnect interface.

As further discussed above, the act of the display controller detecting that the display panel is connected with the display controller could be based on power transfer between the display controller and the display panel. For instance, this could include the display controller receiving a signal that the display panel provides responsive to the display panel having detected power from the display controller.

In addition, as discussed above, the act of the display controller determining the configuration of the display panel could involve the display controller receiving from the display panel a set of panel configuration data defining the configuration of the display panel. Alternatively or additionally, the act of the display controller determining the configuration of the display panel could involve the display controller receiving from the display panel an identification of the display panel and using that received identification as a basis to acquire panel configuration data that defines the configuration of the display panel.

Still further, as discussed above, the act of dynamically configuring the display controller based on the determined configuration of the display panel could involve activating or deactivating certain program logic at the display controller, based on the determined configuration of the display panel.

As further discussed above, the act of determining the configuration of the display panel could involve determining a display technology of the display panel, and the act of dynamically configuring the display controller based on the determined configuration of the display panel could involve, based on the determined display technology of the display panel, configuring whether the display controller will engage in backlight-dimming control of the display panel. Further, as discussed above, the act of determining the display technology of the panel could involve determining whether or not a display technology of the display panel includes backlighting, and the act of configuring whether the display controller will engage in backlight-dimming control of the display panel could be based on the determining of whether or not the display technology of the display panel includes backlighting.

In addition, as discussed above, the act of determining the configuration of the display panel could involve determining whether the display panel supports zone-based dimming, and the act of dynamically configuring the display controller based on the determined configuration of the display panel could involve, based on the determining of whether the display panel supports zone-based dimming, controlling whether the display controller will engage in zone-based dimming control of the display panel.

Still further, as discussed above, the act of determining the configuration of the display panel could involve determining a color-space mapping of the display panel, and the act of dynamically configuring the display controller based on the determined configuration of the display panel could involve configuring the display controller to apply the determined color-space mapping of the display panel, to translate color space information in video that the display controller provides to the display panel for presentation.

Yet further, as discussed above, the act of determining the configuration of the display panel could involve determining configuration of an ambient light sensor of the display panel (e.g., a sensitivity of the ambient light sensor), and the act of dynamically configuring the display controller based on the determined configuration of the display panel could involve configuring the display controller to normalize light sensor readings from the ambient light sensor, with the normalizing being based on the determined configuration of the ambient light sensor.

In line with the discussion above, the present disclosure also contemplates a display controller, which could include a transceiver and an SoC, possibly integrated with each other. The transceiver could be configured to connect the display controller through an interconnect interface with a display panel. And the SoC could include a CPU, non-transitory data storage, and program instructions stored in the non-transitory data storage and executable by the CPU to carry out operations for dynamically configuring the display controller based on configuration of the display panel, such as operations like those discussed above for instance.

As noted above, when such a display controller and display panel are connected with each other, they could cooperatively form part of a television. Further, the act of dynamically configuring the display controller could involve one or more operations such as dynamically configuring whether the display controller will engage in backlight-dimming control of the display panel, dynamically configuring whether the display controller will engage in zone-based dimming control of the display panel, and/or dynamically configuring the display controller to normalize ambient-light-sensor readings from the display panel.

Further, the present disclosure also contemplates a non-transitory computer-readable medium having stored thereon program instructions executable by a processing unit of a display controller to cause the display controller to carry out various operations such as those discussed above.

Exemplary embodiments have been described above. Those skilled in the art will understand, however, that changes and modifications may be made to these embodiments without departing from the true scope and spirit of the invention.

What is claimed is:

1. A method to dynamically configure a display controller based on configuration of a connected display panel, the method comprising:

detecting by the display controller that the display panel is connected with the display controller; and responsive to detecting that the display panel is connected with the display controller, (i) determining by the display controller a configuration of the display panel, and (ii) based on the determined configuration of the display panel, dynamically configuring the display controller to interwork with the connected display panel having the determined configuration, wherein dynamically configuring the display controller comprises dynamically configuring the display controller to normalize ambient-light-sensor readings from the display panel, wherein the display controller and display panel cooperatively form at least part of a television.

2. The method of claim 1, wherein the display panel being connected with the display controller comprises the display panel being connected with the display controller through a serial interconnect interface.

3. The method of claim 1, wherein detecting by the display controller that the display panel is connected with the display controller is based on power transfer between the display controller and the display panel.

4. The method of claim 3, wherein detecting by the display controller that the display panel is connected with the display controller comprises receiving by the display controller a signal that the display panel provides responsive to the display panel having detected power from the display controller.

5. The method of claim 1, wherein determining by the display controller the configuration of the display panel comprises receiving by the display controller from the display panel a set of panel configuration data defining the configuration of the display panel.

6. The method of claim 1, wherein determining by the display controller the configuration of the display panel comprises receiving by the display controller from the display panel an identification of the display panel and using by the display controller the received identification as a basis to acquire panel configuration data defining the configuration of the display panel.

7. The method of claim 1, wherein dynamically configuring the display controller based on the determined configuration of the display panel comprises activating or deactivating program logic at the display controller, based on the determined configuration of the display panel.

8. The method of claim 1, wherein determining the configuration of the display panel comprises determining configuration of an ambient light sensor of the display panel, and wherein normalizing the ambient-light-sensor readings is based on the determined configuration of the ambient light sensor.

9. The method of claim 8, wherein the configuration of the ambient light sensor comprises a sensitivity of the ambient light sensor.

10. The method of claim 1, wherein determining the configuration of the display panel comprises determining a display technology of the display panel, and wherein dynamically configuring the display controller based on the determined configuration of the display panel further comprises, based on the determined display technology of the display panel, controlling whether the display controller will engage in backlight-dimming control of the display panel.

11. The method of claim 10, wherein determining the display technology of the panel comprises determining whether or not a display technology of the display panel includes backlighting, and wherein controlling whether the display controller will engage in backlight-dimming control of the display panel is based on the determining of whether or not the display technology of the display panel includes backlighting.

12. The method of claim 1, wherein determining the configuration of the display panel comprises determining whether the display panel supports zone-based dimming, and wherein dynamically configuring the display controller based on the determined configuration of the display panel further comprises, based on the determining of whether the display panel supports zone-based dimming, controlling whether the display controller will engage in zone-based dimming control of the display panel.

13. The method of claim 1, wherein determining the configuration of the display panel comprises determining a physical arrangement of backlight dimming zones of the display panel, and wherein dynamically configuring the display controller based on the determined configuration of the display panel further comprises configuring the display controller to control backlighting of the display panel in a manner based on the determined physical arrangement of backlight dimming zones of the display panel.

14. The method of claim 1, wherein determining the configuration of the display panel comprises determining a color-space mapping of the display panel, and wherein dynamically configuring the display controller based on the determined configuration of the display panel further comprises configuring the display controller to apply the determined color-space mapping of the display panel, to translate color space information in video that the display controller provides to the display panel for presentation.

15. A display controller comprising:

a transceiver configured to connect the display controller through an interconnect interface with a display panel; and a system on a chip including a central processing unit (CPU), non-transitory data storage, and program instructions stored in the non-transitory data storage and executable by the CPU to carry out operations for dynamically configuring the display controller based on configuration of the display panel, the operations including:

detecting that the display panel is connected with the display controller, and responsive to detecting that the display panel is connected with the display controller, (i) determining a configuration of the display panel, and (ii) based on the determined configuration of the display panel, dynamically configuring the display controller to interwork with the connected display panel having the determined configuration, wherein dynamically configuring the display controller comprises dynamically configuring the display controller to normalize ambient-light-sensor readings from the display panel, wherein when the display controller and display panel are connected with each other, the display controller and display panel cooperatively form at least part of a television.

16. The display controller of claim 15, wherein dynamically configuring the display controller further comprises dynamically controlling whether the display controller will engage in backlight-dimming control of the display panel.

17. The display controller of claim 15, wherein dynamically configuring the display controller further comprises dynamically controlling whether the display controller will engage in zone-based dimming control of the display panel.

18. The display controller of claim 15, wherein determining the configuration of the display panel comprises determining a configuration of an ambient light sensor of the display panel, wherein the configuration of the ambient light sensor comprises a sensitivity of the ambient light sensor, and wherein normalizing the ambient-light-sensor readings is based on the determined configuration of the ambient light sensor.

19. A non-transitory computer-readable medium having stored thereon instructions executable by a processing unit of a display controller to cause the display controller to carry out operations comprising:

detecting that a display panel is connected with the display controller; and responsive to detecting that the display panel is connected with the display controller, (i) determining a configuration of the display panel, and (ii) based on the determined configuration of the display panel, dynamically configuring the display controller to interwork with the connected display panel having the determined configuration, wherein dynamically configuring the display controller comprises dynamically configuring the display controller to normalize ambient-light-sensor readings from the display panel, wherein when the display controller and display panel are connected with each other, the display controller and display panel cooperatively form at least part of a television.

20. The non-transitory computer-readable medium of claim 19, wherein determining the configuration of the display panel comprises determining a configuration of an ambient light sensor of the display panel, wherein the configuration of the ambient light sensor comprises a sensitivity of the ambient light sensor, and wherein normalizing the ambient-light-sensor readings is based on the determined configuration of the ambient light sensor.

* * * * *